United States Patent
Oohara

(10) Patent No.: US 10,627,802 B2
(45) Date of Patent: Apr. 21, 2020

(54) BEARING LIFE-SPAN PREDICTION DEVICE

(71) Applicant: FANUC CORPORATION, Yamanashi (JP)

(72) Inventor: Taku Oohara, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/142,098

(22) Filed: Sep. 26, 2018

(65) Prior Publication Data

US 2019/0107824 A1    Apr. 11, 2019

(30) Foreign Application Priority Data

Oct. 11, 2017  (JP) ................................ 2017-197626

(51) Int. Cl.
G05B 19/4065    (2006.01)

(52) U.S. Cl.
CPC ............... *G05B 19/4065* (2013.01); *G05B 2219/37209* (2013.01); *G05B 2219/37252* (2013.01); *G05B 2219/42328* (2013.01)

(58) Field of Classification Search
CPC ...... G05B 19/4065; G05B 2219/37209; G05B 2219/37252; G05B 2219/42328
USPC ........................................................ 703/7
See application file for complete search history.

(56) References Cited

U.S. PATENT DOCUMENTS 5,967,716 A * 10/1999 Katsuzawa ............ B23Q 11/10
408/56

2007/0030162 A1    2/2007  Okada et al.
2017/0219152 A1 *  8/2017  Petrou ................... F16L 27/087

FOREIGN PATENT DOCUMENTS

| CN | 104344957 A | 2/2015 |
|----|-------------|--------|
| CN | 105628382 A | 6/2016 |
| CN | 107134887 A | 9/2017 |
| JP | 2009-243361 A | 10/2009 |
| JP | 2009-293593 A | 12/2009 |
| JP | 2010-223951 A | 10/2010 |
| JP | 2017-024120 A | 2/2017 |
| KR | 20160063032 A | 6/2016 |

OTHER PUBLICATIONS (Werner, A. An Early Warning Monitoring System for CNC Spindle Bearing Failure, 2011) (Year: 2011).*

(Continued)

*Primary Examiner* — Brian S Cook
(74) *Attorney, Agent, or Firm* — Studebaker & Brackett PC

(57) ABSTRACT

A bearing life prediction device includes a pressure measuring unit that measures the pressure applied to a front bearing, a coolant pressure measuring unit that measures the pressure of a coolant liquid, a detecting unit that measures or predicts the rotation number and the temperature, a storage unit that stores model information and motor specification information in correlation, a specifying unit that inputs or selects the model information, and a bearing life prediction unit that predicts the life of bearings on the basis of the motor specification information including specification information of the bearings stored in the storage unit, and each information on the pressure of the coolant liquid, the pressure applied to the front bearing, the rotation number of the motor, and the temperature of the bearings.

3 Claims, 8 Drawing Sheets

(56) References Cited

OTHER PUBLICATIONS (R. Patole and M. Bhagwat, "Modelling of healthy and faulty three phase induction motor in LabVIEW," 2016 International Conference on Inventive Computation Technologies (ICICT), Coimbatore, 2016, pp. 1-6). (Year: 2016).*
Ling_2015 (Temperature Estimation of Stator Winding for Permanent Magnet Synchronous Motor Used in Electro-hydrostatic Actuator, IEEE International Conference on Advanced Intelligent Mechatronics (AIM) 2015). (Year: 2015).*
An Office Action mailed by the State Intellectual Property Office of the People's Republic of China dated Jul. 25, 2019, which corresponds to Chinese Patent Application No. 201811173557.X and is related to U.S. Appl. No. 16/142,098; with partial English translation.

* cited by examiner

BEARING LIFE-SPAN PREDICTION DEVICE

This application is based on and claims the benefit of priority from Japanese Patent Application No. 2017-197626, filed on 11 Oct. 2017, the content of which is incorporated herein by reference.

BACKGROUND OF THE INVENTION

Field of the Invention

The present invention relates to a hearing life prediction device for predicting a life of a bearing of a motor.

Related Art

In recent years, there are many types of machine tools in which center-through cooling is performed. In this type, a motor having a rotating shaft portion in which a through-hole is formed so that a coolant liquid can pass therethrough is used. The rotating shaft portion has a rear end connected to a coolant delivery unit by a rotary joint and a front end connected to a spindle by a connecting portion.

Although the rotating shaft portion is rotatably supported by a pair of bearings, a thrust load may be applied to the rotating shaft portion by the pressure of a coolant liquid, and as a result, an inner shaft of the bearing may move or an unexpected load may be applied via the inner shaft. Depending on the magnitude and the direction of the pressure of a coolant liquid, the bearing may enter an inappropriate state and the bearing life may decrease.

Here, prediction of a bearing life based on the influence by the pressure of a coolant liquid is important in order for appropriate use and replacement time prediction of a bearing as well as appropriate use and management of a machine tool.

However, prediction of a bearing life based on the influence by the pressure of a coolant liquid has many influencing factors and the prediction operation is complex. Moreover, even if the bearing life is predicted, since the pressure of a coolant liquid and the motor driving conditions are different for respective actual machining cycle operations, there is a problem that it is difficult to predict the bearing life accurately. Particularly, it is difficult to predict in detail the influence on a bearing, of the pressure of a coolant liquid during an actual machining cycle operation.

In contrast, a machine tool capable of measuring an axial (thrust) load acting on a spindle during cutting, for example, has been proposed (for example, see Patent Document 1).

Patent Document 1: Japanese Unexamined Patent Application, Publication No. 2010-223951

SUMMARY OF THE INVENTION

However, the technique disclosed in Patent Document 1, only measures the load acting on the spindle and does not measure the load applied to a rotating shaft portion connected to the spindle via a connecting portion, and further the influence of the pressure of a thrust liquid is not taken into consideration. Moreover, Patent Document 1 does not disclose a technique of predicting a life of a bearing that rotatably supports a rotating shaft portion.

An object of the present invention is to provide a bearing life prediction device capable of predicting a life of a bearing of a motor by taking the load on a rotating shaft portion by the pressure of a coolant liquid into consideration.

(1) The present invention provides a bearing life prediction device (for example, a bearing life prediction device 2 to be described later) that predicts a life of a pair of bearings (for example, a front bearing 18 and a rear bearing 19 to be described later) that rotatably supports a rotating shaft portion (for example, a rotating shaft portion 16 to be described later) of a motor (for example, a motor 10 to be described later) used in a machine tool, through which a coolant liquid (for example, a coolant liquid 5 to be described later) can be passed, the rotating shaft portion being connected to a coolant delivery unit (for example, a coolant delivery unit 20 to be described later) via a rotary joint (for example, a rotary joint 25 to be described later) at one end in a rotating shaft direction (for example, a rotating shaft direction X to be described later) and connected to a spindle (for example, a spindle 30 to be described later) capable of discharging the coolant liquid via a connecting portion (for example, a connecting portion 35 to be described later) at the other end, the bearing life prediction device including: a pressure measuring unit (for example, a pressure sensor 125 to be described later) that measures a pressure in the rotating shaft direction applied to a front bearing (for example, a front bearing 18 to be described later) disposed on the other end side (for example, an X2-side to be described later) in the rotating shaft direction of the pair of bearings; a coolant pressure measuring unit (for example, a coolant pressure measuring unit 140 to be described later) that measures a pressure of the coolant liquid; a motor state detecting unit (for example, a temperature sensor 130 and a motor rotation number measuring unit 135 to be described later) that measures or predicts a rotation number of the motor and a temperature of the pair of bearings; a motor information storage unit (for example, a motor information storage unit 250 to be described later) that stores model information for specifying respective motor models and motor specification information which is specification information of each motor model and includes at least specification information of the pair of bearings in correlation; a motor model specifying unit (for example, a motor model specifying unit 431 to be described later) that inputs or selects model information for specifying the motor model; and a bearing life prediction unit (for example, a bearing life prediction unit 350 to be described later) that predicts the life of the pair of bearings on the basis of the motor specification information including the specification information of the pair of bearings stored in the motor information storage unit in correlation with the model information input or selected by the motor model specifying unit, pressure information of the coolant liquid measured by the coolant pressure measuring unit, pressure information in the rotating shaft direction applied to the front bearing measured by the pressure measuring unit, rotation number information of the motor measured or predicted by the motor state detecting unit, and temperature information of the pair of bearings.

(2) The bearing life prediction device according to (1) may further include: a machining operation unit (for example, a machining operation unit 410 to be described later) that drives and moves the motor in a predetermined machining cycle and delivers the coolant liquid to the coolant delivery unit, the machining operation unit may cause the motor and the coolant delivery unit to execute a first machining cycle operation in a state in which an actual machining operation is not performed, and the bearing life prediction unit may predict a first bearing life of the pair of bearings on the basis of various pieces of information measured in the first machining cycle operation.

(3) The bearing life prediction device according to may further include: an operating time measuring unit (for example, an operating time measuring unit 380 to be described later) that measures an operating time in which the motor and the coolant delivery unit executed the first machining cycle operation; an operating time storage unit (for example, an operating time storage unit 280 to be described later) that stores the operating time in which the first machining cycle operation was executed, measured by the operating time measuring unit; and a bearing life storage unit (for example, a bearing life storage unit 290 to be described later) that stores the first bearing life predicted in the first machining cycle operation, wherein when a machining cycle is changed from the first machining cycle to a second machining cycle, the machining operation unit may cause the motor and the coolant delivery unit to execute a second machining cycle operation in a state in which an actual machining operation not performed, the bearing life prediction unit may predict a second bearing life of the pair of bearings on the basis of various pieces of information measured in the second machining cycle operation, and the bearing life prediction unit may predict a remaining life of the pair of bearings on the basis of the predicted second bearing life, the first bearing life stored in the bearing life storage unit, and the operating time stored in the operating time storage unit.

(4) The bearing life prediction device according to (2) or (3) may further include: an extension instruction unit (for example, an extension instruction unit 437 to be described later) that outputs an instruction on extension of the predicted first bearing life of the bearing and an extension period, and the bearing life prediction unit may calculate a coolant pressure for changing the bearing life to a third bearing life which is the sum of the first bearing life and the extension period instructed by the extension instruction unit.

(5) In the bearing life prediction device according to any one of (1) to (4), the motor may include a rotor (for example, a rotor 15 to be described later) including the rotating shaft portion (16) and a rotating main body (for example, a rotating main body 17 to be described later) and a stator (for example, a stator 12 to be described later) including a plurality of slots (for example, slots 101 to be described later) that stores the rotating main body, faces an outer circumferential surface of the rotating main body, and has a winding, and the motor state detecting unit may measure a temperature of the winding inserted into any one of the plurality of slots to estimate the temperature of the bearing.

According to the present invention, it is possible to provide a bearing life prediction device capable of predicting a life of a bearing of a motor by taking the load on a rotating shaft portion by the pressure of a coolant liquid into consideration.

DETAILED DESCRIPTION OF THE INVENTION

Figure 1:
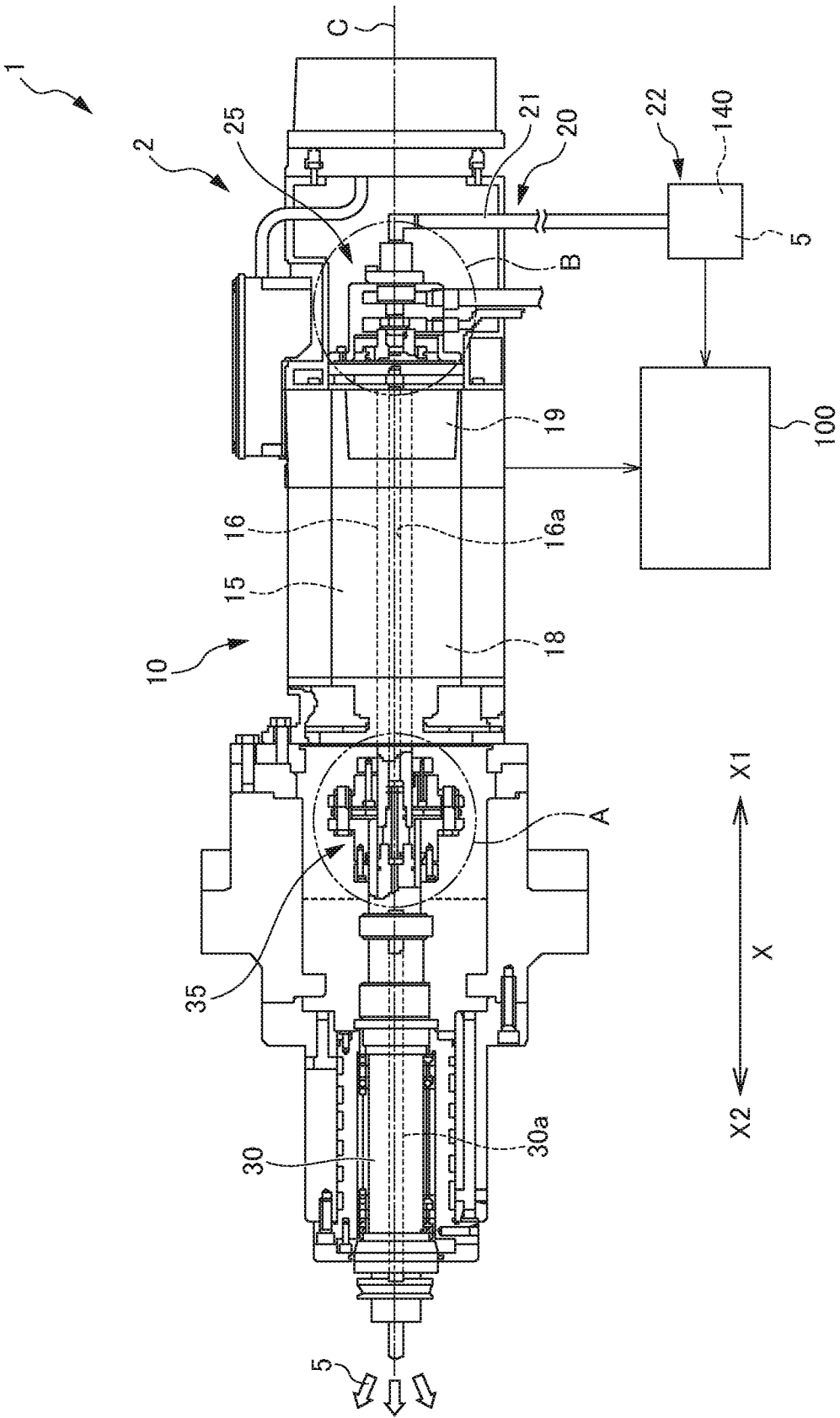
FIG. 1 is a diagram illustrating a portion of a configuration of a motor controller including a bearing life prediction device act an embodiment.
Figure 2:
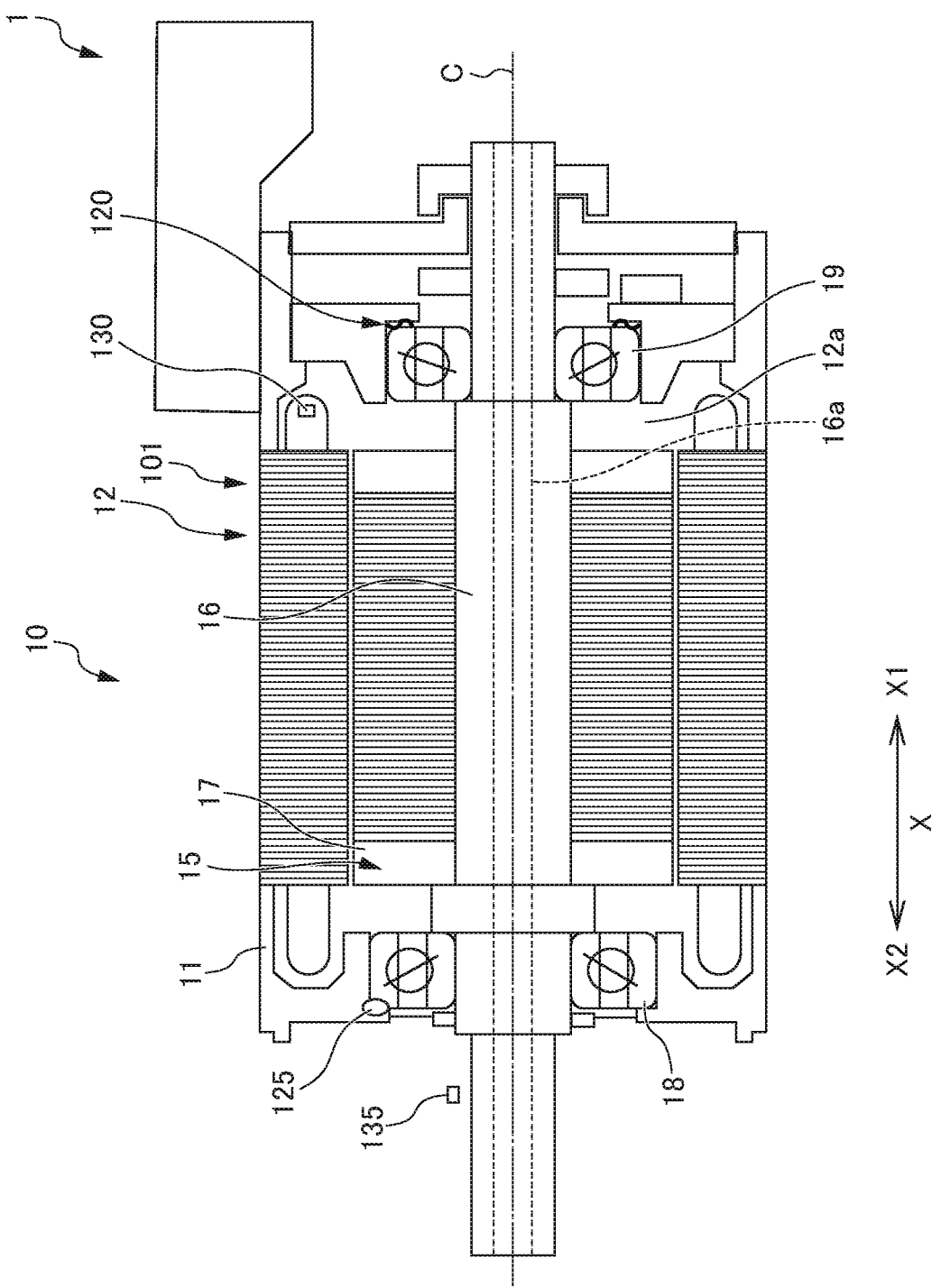
FIG. 2 is a cross-sectional view illustrating a configuration of a motor according to an embodiment.
Figure 3:
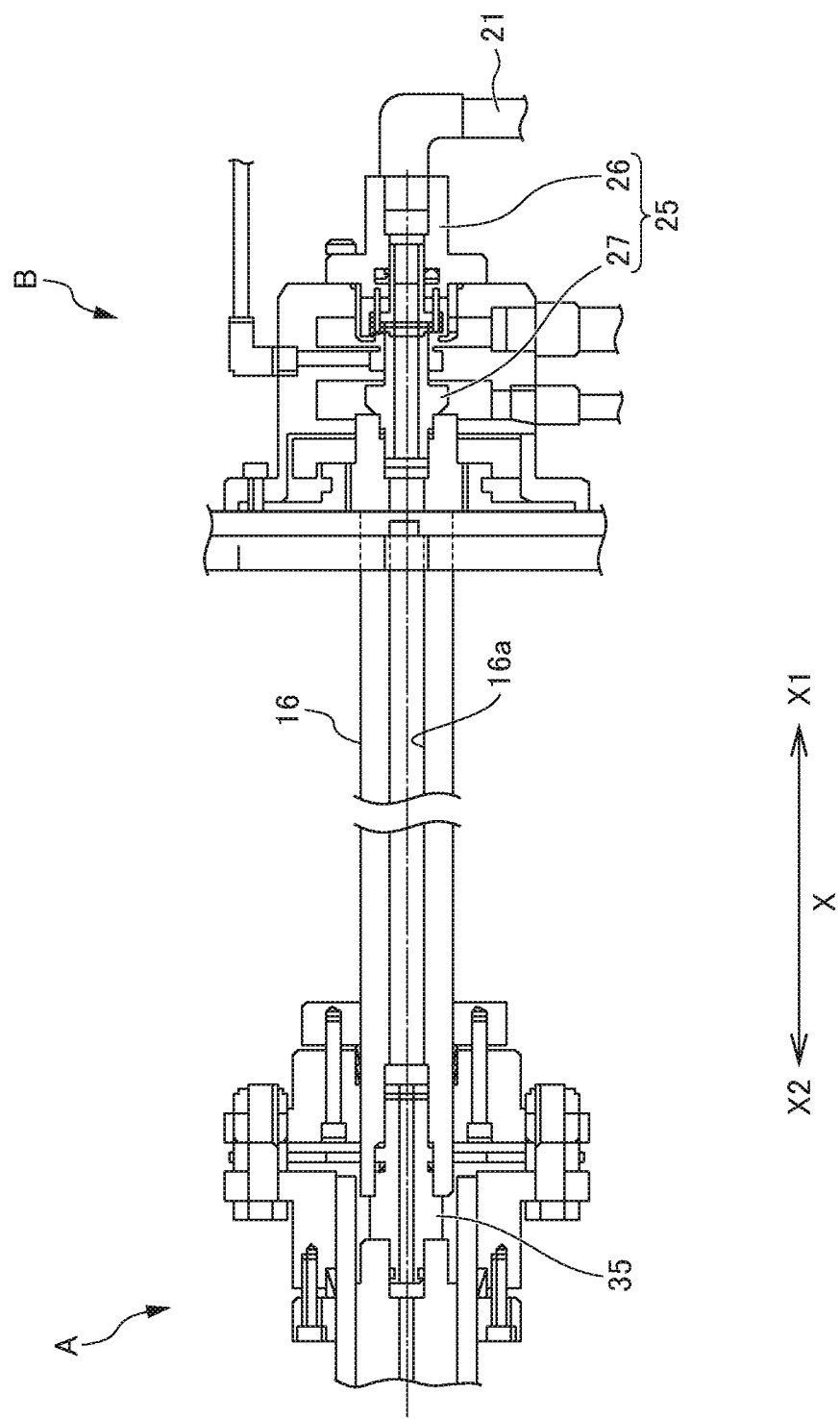
FIG. 3 is an enlarged view of regions A and B in FIG. 1 and is a diagram illustrating a connecting portion and a rotary joint.
Figure 4:
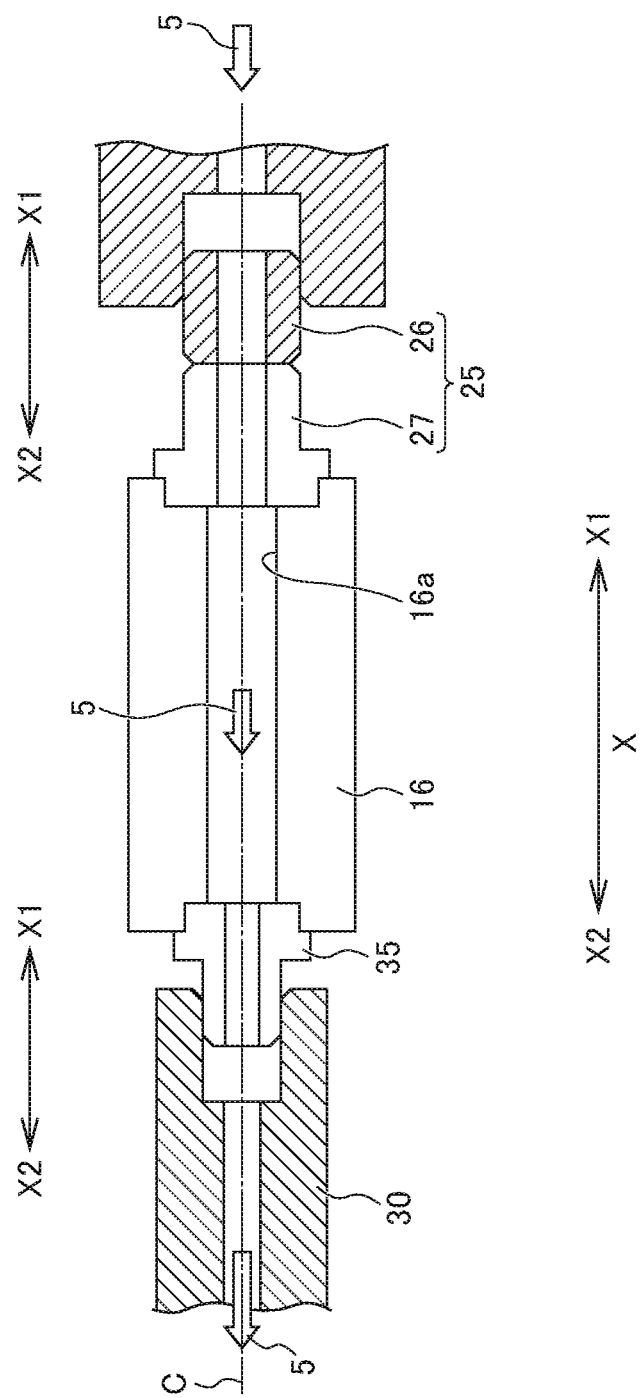
FIG. 4 is a schematic diagram illustrating a relation between a rotating shaft portion, a connecting portion, and a rotary joint of a motor according to an embodiment.

Hereinafter, an embodiment of the present invention will be described in detail with reference to the drawings. First, by referring to FIGS. 1 to 4, a motor controller including a bearing life prediction device according to an embodiment will be described. FIG. 1 is a diagram illustrating a portion of a configuration of a motor controller including a bearing life prediction device according to an embodiment. FIG. 2 is a cross-sectional views illustrating a configuration of a motor according to an embodiment. FIG. 3 is an enlarged view of regions A and B in FIG. 1 and is a diagram illustrating a connecting portion and a rotary joint. FIG. 4 is a schematic diagram illustrating a relation between a rotating shaft portion, a connecting portion, and a rotary joint of a motor according to an embodiment.

As illustrated in FIG. 1, a motor controller 1 (a machine tool) of the present embodiment includes a motor 10, a coolant delivery unit 20 connected to the motor 10 on a rear side (an X1 side in a rotating shaft direction X), a spindle 30 connected to the motor 10 on a front side (an X2 side in the rotating shaft direction X), and a processing unit 100 that can acquire information on the state of the motor 10 and pressure information of a coolant liquid 5 and the like, and includes a bearing life prediction unit 350 (see FIG. 5) which predicts a life of a pair of bearings 18 and 19 of the motor 10.

The coolant delivery unit 20 is connected by a rotary joint 25 on the rear side (the X1 side) in the rotating shaft direction X of the motor 10. The coolant delivery unit 20 includes a coolant supply portion 22 and a coolant delivery path 21. The coolant supply portion 22 delivers the coolant liquid 5 at a predetermined pressure. The coolant delivery path 21 delivers the coolant liquid 5 from the coolant supply portion 22 to the rotating shaft portion 16. The coolant delivery unit 20 delivers the coolant liquid 5 to a spindle 30 via a rotating shaft portion 16 and discharges the coolant liquid 5 from a discharge port formed in the spindle 30. Here, the coolant liquid 5 is a liquid that serves as a cutting liquid and/or a cooling liquid.

The spindle 30 is connected by a connecting portion 35 on the front side (the X2 side) in the rotating shaft direction x of the motor 10. The spindle 30 is rotated by driving of the motor 10 to machine a machining target (not illustrated). The spindle 30 has a discharge port (not illustrated) and a discharge path 30a. The discharge path 30a delivers the coolant liquid 5 from the rotating shaft portion 16 (the liquid path 16a) to the discharge port.

As illustrated in FIGS. 1 to 3, the motor 10 is connected to the coolant delivery unit 20 by the rotary joint 25 on the rear side (the A1 side in the rotating shaft direction X) and is connected to the spindle 30 by the connecting portion 35 on the front side (the A2 side in the rotating shaft direction X).

Specifically, as illustrated in FIG. 4, the rotating shaft portion 16 having the liquid path 16*a* through which the coolant liquid 5 passes is connected to the coolant delivery unit 20 via the rotary joint 25 at one end (the X1 side, the rear end) in the rotating shaft direction X and is connected to the spindle 30 capable of discharging the coolant liquid 5 via the connecting portion 35 at the other end (the X2 side, the front end).

As illustrated in FIG. 2, the rotating shaft portion 16 is rotatably supported by a front bearing 18 disposed on the front side (the X2 side) in the rotating shaft direction X and a rear bearing 19 disposed on the rear side (the X1 side) in the rotating shaft direction X. A load (a thrust load) in the rotating shaft direction X generated by the pressure of the coolant liquid 5 (hereinafter sometimes referred to as a "coolant pressure") is applied to the rotating shaft portion 16 in a state in which the coolant liquid 5 is discharged from the distal end of the spindle 30 (hereinafter sometimes referred to as a "coolant state").

Here, the load in the rotating shaft direction X by the coolant pressure applied to the rotating shaft portion 16 may also have an influence on the front bearing 18 and the rear bearing 19 via the rotating shaft portion 16. The bearing life prediction device 2 of the present embodiment predicts the life of the pair of bearings 18 and 19 by taking the load in the rotating shaft direction X by the coolant pressure which also has influence on the front bearing 18 and the rear bearing 19 via the rotating shaft portion 16 into consideration.

As illustrated in FIGS. 1 and 2, the motor 10 includes a stator 12, a rotor 15, a housing 11, the pair of bearings 18 and 19, a biasing member 120, a pressure sensor 125, a temperature sensor 130, and a motor rotation number measuring unit 135. The motor 10 according to the embodiment is an induction motor, for example, and operates according to electromagnetic induction from windings arranged in a plurality of slots 101 disposed in the stator 12 to be described later to a short-circuited bare conductor (not illustrated) disposed in the rotor 15. The induction motor is widely used due to its simple structure and easy maintenance.

The stator 12 has a cylindrical inner space 12*a* and the plurality of slots 101 having windings and disposed in an inner circumferential surface that form an outer edge of the inner space 12*a*. The stator 12 is formed of a plurality of magnetic steel plates stacked in an axial direction. The inner space 12*a* is a space in which the rotor 15 can be rotatably stored. Each of the plurality of slots 101 has a winding and is formed to extend in the rotating shaft direction X.

The rotor 15 is stored and disposed in the inner space 12*a* of the stator 12 so as to be rotatable about a rotating shaft C. The rotor 15 has a rotating shaft portion 16 and a rotating main body 17.

The rotating shaft portion 16 is disposed along the rotating shaft C. The rotating shaft portion 16 rotates integrally with the rotating main body 17. The rotating shaft portion 16 has a liquid path 16*a* through which the coolant liquid 5 passes. The liquid path 16*a* is a through-hole formed to pass through from one end in the rotating shaft direction X of the rotating shaft portion 16 to the other end. The liquid path 16*a* allows the coolant liquid 5 supplied from the coolant delivery unit 20 to pass to the discharge path 30*a* formed in the spindle 30.

As described above, the rotating shaft portion 16 is connected to the coolant delivery unit 20 via the rotary joint 25 at one end (the X1 side, the rear end) in the rotating shaft direction X and is connected to the spindle 30 capable of discharging the coolant liquid 5 via the connecting portion 35 at the other end (the X2 side, the front end).

As described above, the rotating shaft portion 16 is rotatably supported by the front bearing 18 disposed on the front side (the X2 side) in the rotating shaft direction X and the rear bearing 19 disposed on the rear side (the X1 side) in the rotating shaft direction X.

As described above, the load in the rotating shaft direction X generated by the pressure of the coolant liquid 5 is applied to the rotating shaft portion 16 in a state in which the coolant liquid 5 is discharged from the distal end of the spindle 30. Due to this, the rotating shaft portion 16 may move the inner ring of the pair of bearings 18 and 19. Moreover, the rotating shaft portion 16 may apply unexpected pressure to the pair of bearing 18 and 19. In the present embodiment, the load (pressure) in the rotating shaft direction X applied to the rotating shaft portion 16 can be measured by the pressure sensor 125 to be described later. Moreover, the load in the rotating shaft direction X applied to the rotating shaft portion 16 can be calculated by the bearing life prediction unit 350 to be described later on the basis of the coolant pressure, an outer diameter of the rotary joint 25 in a rotating member 27, and an outer diameter of the connecting portion 35, and the like.

The rotating main body 17 has a columnar shape and is disposed coaxially with respect to the rotating shaft portion 16. The rotating main body 17 is fixed to the rotating shaft portion 16. A short-circuited bare conductor (not illustrated) is disposed in the rotating main body 17. At least part of the rotating main body 17 is disposed in the inner space 12*a* of the stator 12. The rotating main body 17 is disposed to be rotatable about the rotating shaft C.

The housing 11 forms an outer shape of the motor 10 and stores the stator 12 and the rotor 15. The housing 11 holds the pair of bearings 18 and 19.

As described above, the pair of bearings 18 and 19 rotatably holds the rotating shaft portion 16. The front bearing 18 is disposed on the X2 side (the front side) in the rotating shaft direction X. The rear bearing 19 is disposed on the X1 side (the rear side) in the rotating shaft direction X.

In the present embodiment, an appropriate pre-load is applied to the pair of bearings 18 and 19. Specifically, an appropriate pre-load is applied to the rear bearing 19 by a biasing member 120 (for example, a disk spring or the like) to be described later. The pre-load applied to the rear bearing 19 is applied to the front bearing 18 via the rotating shaft portion 16. According to the pair of bearings 18 and 19 to which an appropriate pre-load is applied, since occurrence of vibration and nose is suppressed and the bearings 18 and 19 are used in an appropriate state, deterioration and failures are suppressed.

In contrast, when the pre-load is not appropriate or the pre-load is changed to an inappropriate pressure, the pair of bearings 18 and 19 may generate vibration and noise and deterioration and failures may occur. The life of the pair of bearings 18 and 19 may decrease if the bearings are used in such a state.

One of the causes of the change from an appropriate pre-load to an inappropriate pressure is a coolant pressure. A thrust load that a coolant pressure applies to the rotating shaft portion 16 has an influence on the pair of bearings 18 and 19. Due to this, the coolant pressure is one of the causes having an influence on the operation and the life of the pair of bearings 18 and 19.

In the present embodiment, the pair of bearings 18 and 19 is a life prediction target. In the present embodiment, the life of the pair of bearings 18 and 19 is predicted by the bearing life prediction device 2.

As described above, the biasing member 120 is a member for applying an appropriate pre-load to the pair of bearings 18 and 19. The biasing member 120 is a disk spring, a spiral spring, or an elastic material, for example, and is not particularly limited. In the present embodiment, the biasing member 120 biases the rear bearing 19 toward the X2 side in the rotating shaft direction X. The biasing member 120 biases the front bearing 18 via the rotating shaft portion 16 as well as biasing the rear bearing 19.

Although the biasing member 120 applies a constant pre-load (constant pressure) to the pair of bearings 18 and 19, when the thrust load based on the coolant pressure exceeds an allowable range, a so-called pre-load loss occurs. In this case, unexpected pressure is applied to the pair of bearings 18 and 19. As described above, in the pair of bearings 18 and 19, vibration and noise may be generated, and deterioration and failures occur. The life of the pair of hearings 18 and 19 may decrease if the bearings are used in such a state.

The balance between the coolant pressure and the pre-load from the biasing member 120 is a factor that has an influence on the life of the pair of bearings 18 and 19. The actual pressure applied to the pair of bearings 18 and 19 and the rotating shaft portion 16 with the coolant pressure and the pre-load from the biasing member 120 taken into consideration can be calculated on the basis of the coolant pressure value and the like and can be measured by the pressure sensor 125 to be described later.

The pressure sensor 125 (a pressure measuring unit) is disposed on the X2 side in the rotating shaft direction X of the front bearing 18. The pressure sensor 125 can measure the pressure in the rotating shaft direction X applied to the front bearing 18. The pressure sensor 125 can measure the pressure in the rotating shaft direction X applied to an outer ring of the front bearing 18.

The pressure sensor 125 can measure the pressure in the rotating shaft direction X applied to the front bearing 18 in a state in which the pre-load from the biasing member 120 and the pressure toward the X1 side in the rotating shaft direction X generated by the coolant pressure. The pressure sensor 125 is configured to be able to output the information on the measured pressure in the rotating shaft direction X applied to the front bearing 18 to the processing unit 100 having the bearing life prediction unit 350.

The temperature sensor 130 (a motor state detecting unit) measures or predicts the temperature of the pair of bearings 18 and 19. The temperature sensor 130 measures the temperature continuously or intermittently. In the present embodiment, the temperature sensor 130 is disposed in the slot 101 of the stator 12. In the present embodiment, the temperature sensor 130 measures the temperature of a winding inserted into the slot 101 disposed close to the pair of bearings 18 and 19 and predicts the measured temperature as the temperature of the pair of bearings 18 and 19. The temperature sensor 130 configured to be able to output the information on the measured temperature to the processing unit 100 having the bearing life prediction unit 350.

The motor rotation number measuring unit 135 (a motor state detecting unit) is configured to be able to measure a rotation number of the motor 10. In the present embodiment, the motor rotation number measuring unit 135 measures the rotation number of the rotating shaft portion 16. The motor rotation number measuring unit 135 is an encoder or the like, for example. The motor rotation number measuring unit 135 is configured to be able to output the information on the measured rotation number to the processing unit 100 having the bearing life prediction unit 350.

A coolant pressure measuring unit 140 (a coolant pressure measuring unit) is configured to be able to measure the pressure of the coolant liquid 5. In the present embodiment, the coolant pressure measuring unit 140 is disposed in the coolant delivery unit 20 (for example, the coolant supply portion 22). The coolant pressure measuring unit 140 is configured to be able to output the information on the measured coolant pressure to the processing unit 100 having the bearing life prediction unit 350.

As illustrated in FIGS. 1 to 3, the connecting portion 35 is connected to the front end (X2-side end, the other end) in the rotating shaft direction X of the rotating shaft portion 16.

The connecting portion 35 is connected to be able to deliver the coolant liquid 5 from the liquid path 16a of the rotating shaft portion 16 to the discharge path 30a of the spindle 30.

As illustrated in FIG. 4, the shape and the type of the connecting portion 35 are not particularly limited. For example, the connecting portion 35 may be a convex coolant joint in which an end on the spindle 30 side is convex and may be a concave coolant joint in which an end on the spindle 30 side is concave.

As illustrated in FIGS. 1 to 3, the rotary joint 25 is connected to the rear end (the X1-side end, one end) in the rotating shaft direction X of the rotating shaft portion 16. The rotary joint 25 is connected to be able to deliver the coolant liquid 5 from the coolant delivery unit 20 to the liquid path 16a of the rotating shaft portion 16.

The rotary joint 25 has a fixed member 26 and a rotating member 27. The fixed member 26 is connected to the coolant delivery path 21 to deliver the coolant liquid 5 toward the rotating member 27. The rotating member 27 is connected directly or indirectly to an end of the liquid path 16a of the rotating shaft portion 16.

The rotary joint 25 may be a separated external supporting-type rotary joint and may be an integrated-type rotary joint.

In the separated external supporting-type rotary joint, the rotating member 27 is separated from the fixed member 26 in a non-coolant state and the rotating member 27 is in contact with the fixed member 26 in a coolant state.

Here, when a separated external supporting-type rotary joint is used, whether the pressure toward the X2 side in the rotating shaft direction X with respect to the front bearing 18 decreases when the coolant pressure increases is determined by the outer diameter of the connecting portion 35 and the outer diameter of the rotary joint 25 in the rotating member 27. Moreover, in an integrated-type rotary joint, regardless of a non-coolant state or a coolant state, the pressure toward the X2 side in the rotating shaft direction X with respect to the front bearing 18 decreases when the coolant pressure increases. As described above, how a coolant pressure is applied to the front bearing 18 (the rear bearing 19) is different depending on the type of the rotary joint. Due to this, the bearing life prediction device 2 to be described later predicts a bearing life by referring to type information capable of specifying whether the rotary joint is a separated type or an integrated type.

Figure 5:
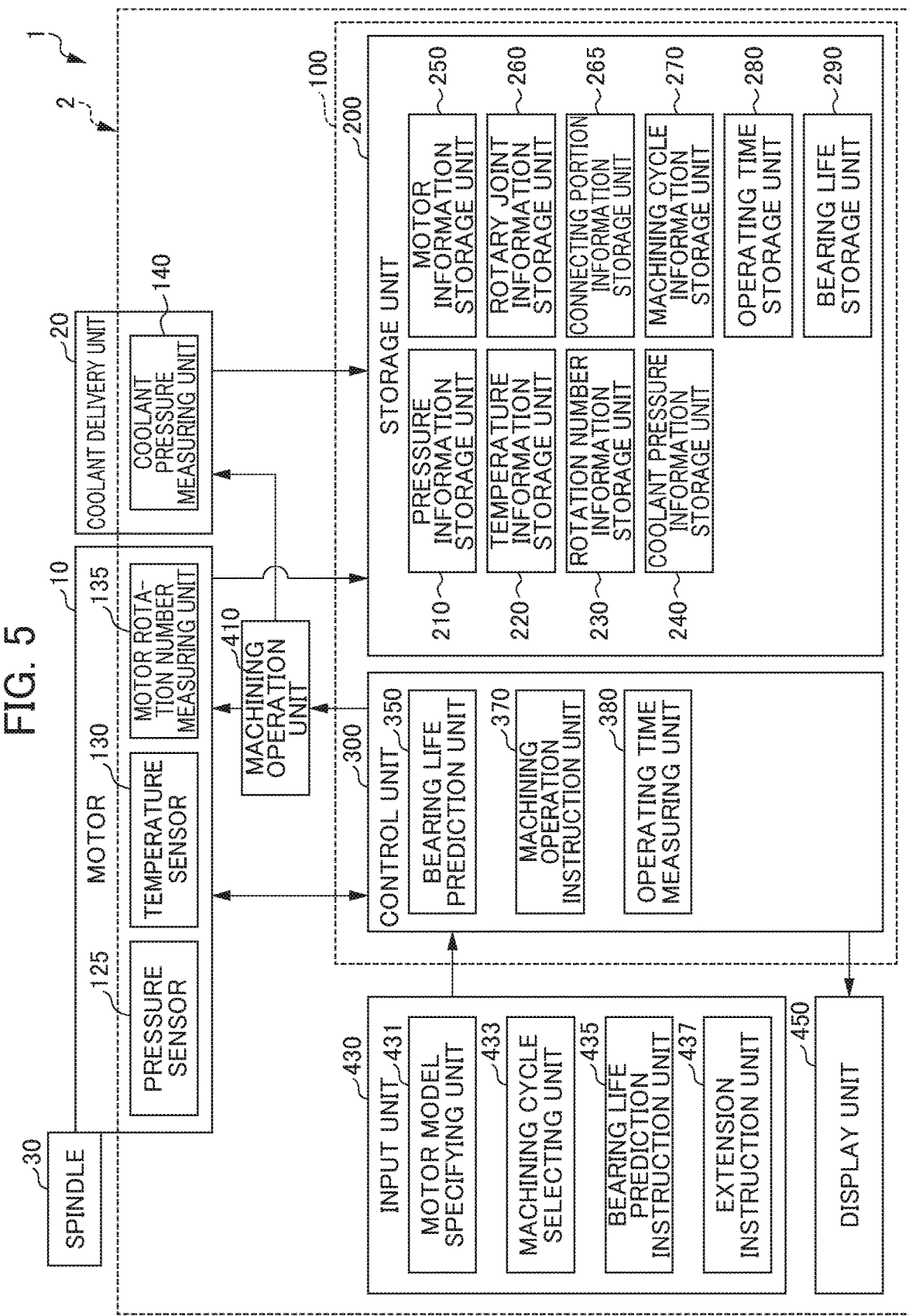
FIG. 5 is a block diagram illustrating a configuration of motor controller including a bearing life prediction device according to an embodiment.

Subsequently, by referring to FIG. 5, a configuration of a motor controller including the bearing life prediction device according to the embodiment will be described. FIG. 5 is a block diagram illustrating a configuration of a motor controller including a bearing life prediction device according to an embodiment.

As illustrated in FIG. 5, the motor controller 1 includes the bearing life prediction device 2. In the present embodiment, the bearing life prediction device 2 includes the pressure sensor 125, the temperature sensor 130, and the motor rotation number measuring unit 135 disposed in the motor 10, the coolant pressure measuring unit 140 disposed in the coolant delivery unit 20, the processing unit 100, a machining operation unit 410, an input unit 430, and a display unit 450.

As described above, the pressure sensor 125 can measure the pressure in the rotating shaft direction X applied to the outer ring of the front bearing 18. The pressure sensor 125 can measure the pressure in the rotating shaft direction X applied to the front bearing 18 in a state in which the pre-load from the biasing member 120 and the pressure toward the X1 side in the rotating shaft direction X generated by the coolant pressure. The pressure sensor 125 is configured to be able to output the information on the measured pressure in the rotating shaft direction X applied to the front bearing 18 to a storage unit 200 (a pressure information storage unit 210).

The temperature sensor 130 measures or predicts the temperature of the pair of bearings 18 and 19. The temperature sensor 130 measures the temperature continuously or intermittently. In the present embodiment, the temperature sensor 130 measures the temperature of a winding inserted into the slot 101 disposed close to the pair of bearings 18 and 19 and predicts the temperature as the temperature of the pair of bearings 18 and 19. The temperature sensor 130 is configured to be able to output the information on the measured temperature to the storage unit 200 (a temperature information storage unit 220).

The motor rotation number measuring unit 135 is configured to be able to output the rotation number of the motor 10. In the present embodiment, the motor rotation number measuring unit 135 measures the rotation number of the rotating shaft portion 16. The motor rotation number measuring unit 135 is configured to be able to output information on the measured rotation number to the storage unit 200 (a rotation number information storage unit 230).

The coolant pressure measuring unit 140 is configured to be able to measure the pressure of the coolant liquid 5. The coolant pressure measuring unit 140 is configured to be able to output the information on the measured coolant pressure to the storage unit 200 (a coolant pressure information storage unit 240).

The processing unit 100 includes the storage unit 200 and a control unit 300. The storage unit 200 includes the pressure information storage unit 210, the temperature information storage unit 220, the rotation number information storage unit 230, the coolant pressure information storage unit 240, a motor information storage unit 250, a rotary joint information storage unit 260, a connecting portion information storage unit 265, a machining cycle information storage unit 270, an operating time storage unit 280, and a bearing life storage unit 290.

The pressure information storage unit 210 stores pressure information in the rotating shaft direction X applied to the front bearing 18 output by the pressure sensor 125.

The temperature information storage unit 220 stores estimated temperature information of the temperature of the rear bearing 19 (the front bearing 18) output by the temperature sensor 130.

The rotation number information storage unit 230 stores the information on the motor rotation number output by the motor rotation number measuring unit.

The coolant pressure information storage unit 240 stores the pressure information of the coolant liquid 5 output by the coolant pressure measuring unit 140.

The motor information storage unit 250 stores model information (for example, a model name or a serial number) specifying respective motor models and motor specification information which is specification information of each motor model and includes specification information of at least the pair of bearings in correlation. In the present embodiment, the motor information storage unit 250 stores the information on the pre-load applied by the biasing member 120. Various pieces of information stored in the motor information storage unit 250 are used as information for the bearing life prediction unit 350 (a bearing life prediction unit) to be described later to predict the life of the pair of bearings 18 and 19.

The rotary joint information storage unit 260 stores rotary joint information including at least outer diameter information of the rotary joint 25 in the rotating member 27. The rotary joint information storage unit 260 stores type information capable of specifying at least a separated type or an integrated type. Various pieces of information stored in the rotary joint information storage unit 260 are used as information for the bearing life prediction unit 350 (a bearing life prediction unit) to be described later to predict the life of the pair of bearings 18 and 19.

The connecting portion information storage unit 265 stores connecting portion information including at least the outer diameter information of the connecting portion 35. Various pieces of information stored in the connecting portion information storage unit 265 are used as information for the bearing life prediction unit 350 (a bearing life prediction unit) to be described later to predict the life of the pair of bearings 18 and 19.

The machining cycle information storage unit 270 stores machining cycle information on a plurality of machining cycles of the motor controller 1 (a machine tool). The machining cycle information stored in the machining cycle information storage unit 270 is read into a machining operation instruction unit 370 to be described later so that the machining operation unit 410 operates in a predetermined machining cycle.

The operating time storage unit 280 stores an operating time in which a predetermined machining cycle operation is executed, measured by an operating time measuring unit 380 to be described later.

The bearing life storage unit 290 stores the bearing life predicted for the predetermined machining cycle operation by the bearing life prediction unit 350.

The control unit 300 includes the bearing life prediction unit 350, the machining operation instruction unit 370, and the operating time measuring unit 380.

The bearing life prediction unit 350 predicts the life of the pair of bearings 18 and 19. The bearing life prediction unit 350 predicts the life of the pair of bearings 18 and 19, for example, on the basis of the motor specification information including specification information of the pair of bearings 18 and 19 stored in the motor information storage unit 250 in correlation with the model information input or selected by the motor model specifying unit 431 to be described later, the information on the coolant pressure measured by the coolant pressure measuring unit 140, the pressure information in the rotating shaft direction X applied to the front bearing 18 measured by the pressure sensor 125, the rotary joint information including at least the outer diameter information of the rotary joint 25 in the rotating member 27 stored in the rotary joint information storage unit 260, the connecting portion information including at least the outer diameter information of the connecting portion 35 stored in the connecting portion information storage unit 265, the information on the rotation number of the motor 10 measured by the motor rotation number measuring unit 135, and the information on the temperature of the bearing measured or predicted by the temperature sensor 130. The bearing life prediction unit 350 predicts the life of the pair of bearings 18 and 19 in response to a prediction instruction from a bearing life prediction instruction unit 435 to be described later, for example.

The bearing life prediction unit 350 predicts a bearing life using the influence on the pair of bearings 18 and 19, of the load in the rotating shaft direction X generated by the coolant pressure as an important factor. The bearing life prediction unit 350 predicts a bearing life using the rotation number and the temperature as an important factor in addition to the influence of the coolant pressure. Here, the bearing life prediction unit 350 may use actual measurement values as the temperature, the pressure, the rotation number, and the thrust load in the rotating shaft direction X, and the like and may use average values of the measurement values obtained in a predetermined period of operation (for example, machining cycle operation).

The bearing life prediction unit 350 may also calculate the load in the rotating shaft direction X generated by the coolant pressure. For example, the load in the rotating shaft direction X generated by the coolant pressure can be calculated by P $(\pi(\phi Dr1)^2 - \pi(\phi Dc1)^2)/4$ (where P is a coolant pressure, $\phi Dr1$ is an outer diameter of the rotary joint 25 in the rotating member 27, and $\phi Dc1$ is an outer diameter of the connecting portion).

The bearing life prediction unit 350 predicts the life of the pair of bearings 18 and 19 on the basis of various pieces of information and the type information stored in the rotary joint information storage unit 260. Since the influence of the thrust load generated by the coolant pressure is different depending on the type (a separated type or an integrated type) of the rotary joint 25, the bearing life prediction unit 350 performs life prediction depending on the type of the rotary joint.

The bearing life prediction unit 350 may be configured to predict the bearing life by a calculation formula that is weighted for respective pieces of information for example and may also predict the bearing life by referring to the bearing life in an approximate situation.

The bearing life prediction unit 350 predicts the life when the motor is in an initial state. Here, when a remaining life is predicted, if the machining cycle operation before reprediction is the same as a present machining cycle operation, the remaining life can be predicted by subtracting an operating time in which the machining cycle operation was executed from a repredicted bearing life.

Here, when the machining cycle operation is changed from a first machining cycle operation to a second machining cycle operation, first, the bearing life prediction unit 350 predicts a second bearing life of the pair of bearings 18 and 19 on the basis of various pieces of information measured in the second machining cycle operation. Subsequently, the bearing life prediction unit 350 predicts the remaining life of the pair of bearings 18 and 19 on the basis of the predicted second bearing life, the first bearing life stored in the bearing life storage unit 290, and the operating time (of the first machining cycle operation) stored in the operating time storage unit 280. The bearing life prediction unit 350 can predict a remaining life by a formula: (second bearing life)÷(first bearing life)×((first bearing life)−(operating time)), for example.

The bearing life prediction unit 350 calculates (calculates back) a coolant pressure for changing the bearing life to a third bearing life which is the sum of the first bearing life and an extension period instructed by an extension instruction unit 437 (an extension instruction unit) to be described later. The bearing life prediction unit 350 can calculate the coolant pressure corresponding to an expected life.

The machining operation instruction unit 370 instructs the machining operation unit 410 to perform a machining operation. Specifically, the machining operation instruction unit 370 acquires information from the machining cycle information storage unit 270 by the machining cycle operation (for example, the first machining cycle operation) selected by a machining cycle selecting unit 433 to be described later and controls the machining operation unit 410 on the basis of the acquired information on the machining cycle operation (for example, the first machining cycle operation).

The operating time measuring unit 380 measures an operating time in which the machining operation unit 410 executed a predetermined machining cycle operation (for example, the first machining cycle operation). The operating time measuring unit 380 measures an operating time in which the motor 10 and the coolant delivery unit 20 executed a predetermined machining cycle operation (for example, the first machining cycle operation). The operating time measuring unit 380 outputs the measured operating time (for example, the first operating time) to the operating time storage unit 280.

The machining operation unit 410 is an operating unit that operates the motor 10 and the coolant delivery unit 20. The machining operation unit 410 includes a driving unit of the motor 10, a driving unit for moving the motor 10, a driving unit for moving an arm and a work, a supply pump for supplying a coolant liquid, and the like, for example. For example, the machining operation unit 410 drives and moves the motor 10 in a predetermined machining cycle and delivers a coolant liquid to the coolant delivery unit 20 according to an instruction from the machining operation instruction unit 370. The machining operation unit 410 executes a machining cycle operation selected by the machining cycle selecting unit 433 on the basis of an instruction from the machining operation instruction unit 370.

When the machining operation instruction unit 370 receives an instruction from the bearing life prediction instruction unit 435, for example, the machining operation unit 410 causes the motor 10 and the coolant delivery unit 20 to execute the first machining cycle operation in a state in which an actual machining operation is not performed. The machining operation unit 410 causes the motor 10 and the coolant delivery unit 20 to execute the first machining cycle operation in a state in which an actual machining operation is not performed in order to predict the bearing life. The machining operation unit 410 causes the motor 10 and the coolant delivery unit 20 to execute the first machining cycle operation in a state in which an actual machining operation is not performed in order to acquire various pieces of information necessary for prediction of the bearing life.

Similarly, when the machining cycle is changed from the first machining cycle to the second machining cycle, the machining operation unit 410 causes the motor 10 and the coolant delivery unit 20 to execute the second machining cycle operation in a state in which an actual machining operation is not performed. When the machining cycle operation is changed, since the bearing life is also changed, it is preferable to predict the bearing life again in the machining cycle operation after change. Due to this, the machining operation unit 410 causes the motor 10 and the coolant delivery unit 20 to execute the first machining cycle operation in a state in which an actual machining operation is not performed in order to acquire various pieces of information necessary for new prediction of the bearing life.

The input unit 430 includes the motor model specifying unit 431, the machining cycle selecting unit 433, the bearing life prediction instruction unit 435, and the extension instruction unit 437. The input unit 430 is a touch panel, various buttons, a keyboard, and the like, for example.

The motor model specifying unit 431 is a part that receives input or selection of model information for specifying a motor model. The model information input or selected by the motor model specifying unit 431 is output to the bearing life prediction unit 350, for example. In this way, the bearing life prediction unit 350 acquires the motor specification information (including the bearing information) stored in correlation with the model information from the motor information storage unit 250 and predicts the bearing life using the acquired information.

The machining cycle selecting unit 433 is a part that receives selection or input of information for specifying a machining cycle operation to be executed by the machining operation unit 410. The information selected or input by the machining cycle selecting unit 433 is output to the machining operation instruction unit 370 and the bearing life prediction unit 350, for example.

The bearing life prediction instruction unit 435 is a part that receives a bearing life prediction instruction with respect to the bearing life prediction unit 350. The bearing life prediction instruction unit 435 instructs the bearing life prediction unit 350 to predict the bearing life in a state in which the motor model is specified by the motor model specifying unit 431 and the machining cycle operation is selected by the machining cycle selecting unit 433, for example. In this way, the bearing life prediction unit 350 predicts the life of the bearing of the specified motor model on the basis of various pieces of information and the like acquired by execution of the selected machining cycle operation in a state in which an actual machining operation is not performed.

The extension instruction unit 437 is a part that receives an instruction on extension and an extension period of the predicted bearing life (for example, the first bearing life) of the bearing. The extension instruction unit 437 is a part that receives an instruction on extension and an extension period of the predicted bearing life (for example, the first bearing life) of the hearing when it is desired to output conditions (for example, a coolant pressure) for extending the predicted bearing life, for example. Upon receiving the instruction on extension and an extension period, the extension instruction unit 437 instructs the bearing life prediction unit 350 to output the conditions (for example, a coolant pressure) for extending the bearing life by the designated extension period. The bearing life prediction unit 350 calculates (calculates back) a coolant pressure for changing the bearing life to a third bearing life which is the sum of the first bearing life and the extension period instructed by the extension instruction unit 437. The bearing life prediction unit 350 calculates the coolant pressure corresponding to an expected life. The bearing life prediction unit 350 can output an instruction to change the coolant pressure.

The display unit 450 displays various pieces of information. The display unit 450 can display the predicted bearing life, for example. The display unit 450 can display the information on the motor model being used, the information on the machining cycle operation, the pressure information from the pressure sensor 125, the temperature information from the temperature sensor 130, the rotation number information from the motor rotation number measuring unit 135, and the coolant pressure information from the coolant pressure measuring unit 140, for example.

Figure 6:
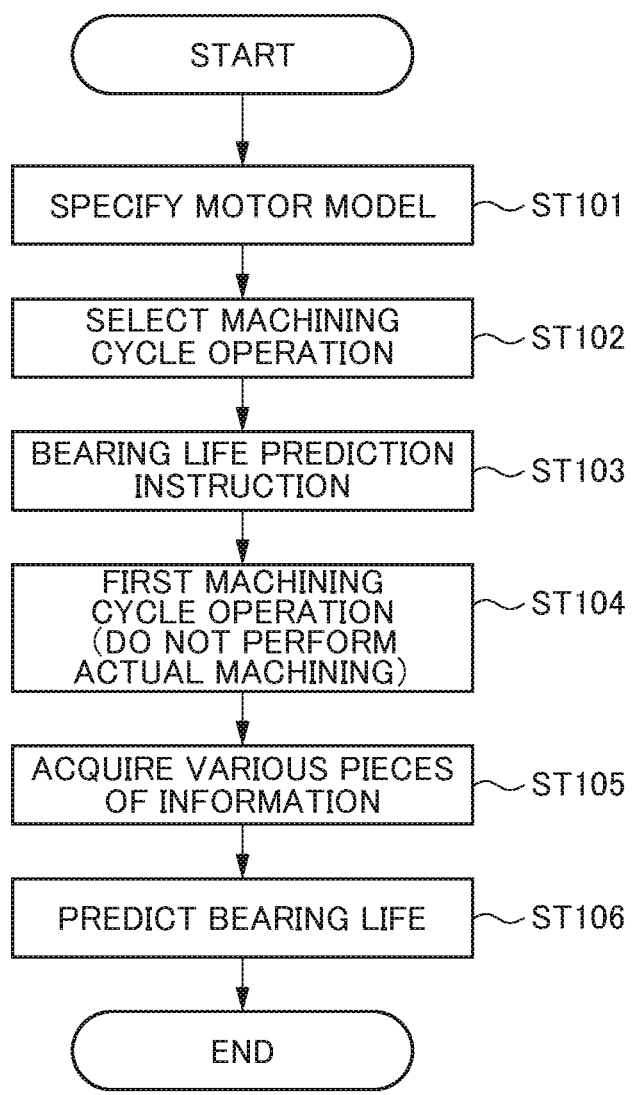
FIG. 6 is a flowchart illustrating a bearing life prediction operation of a bearing life prediction device according to an embodiment.
Figure 7:
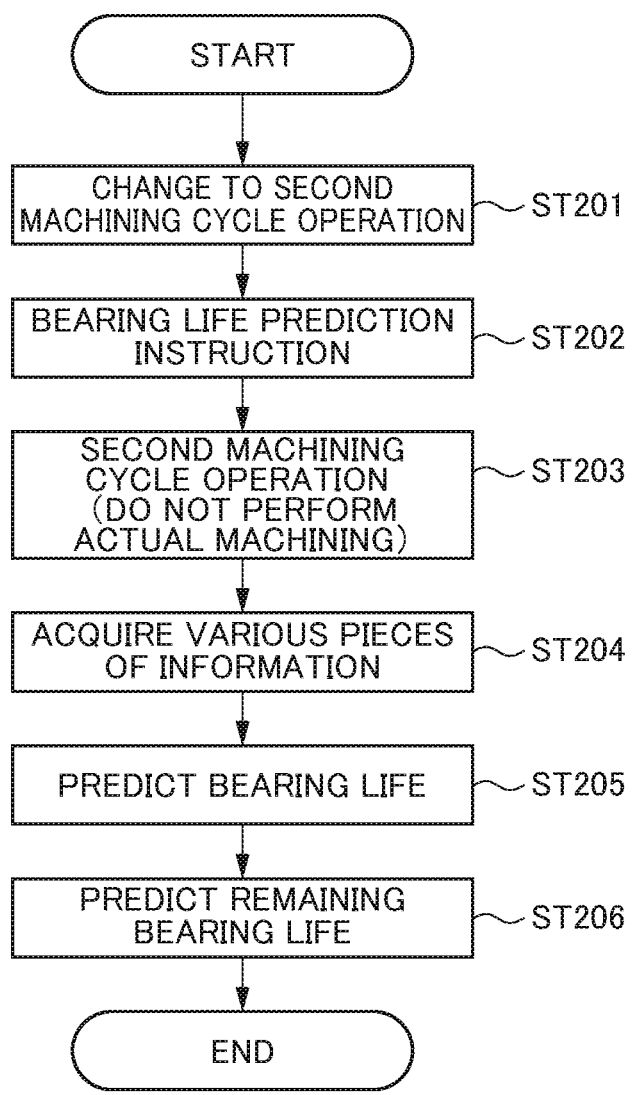
FIG. 7 is a flowchart illustrating a bearing life prediction operation when a machining cycle operation of a bearing life prediction device according to an embodiment is changed.
Figure 8:
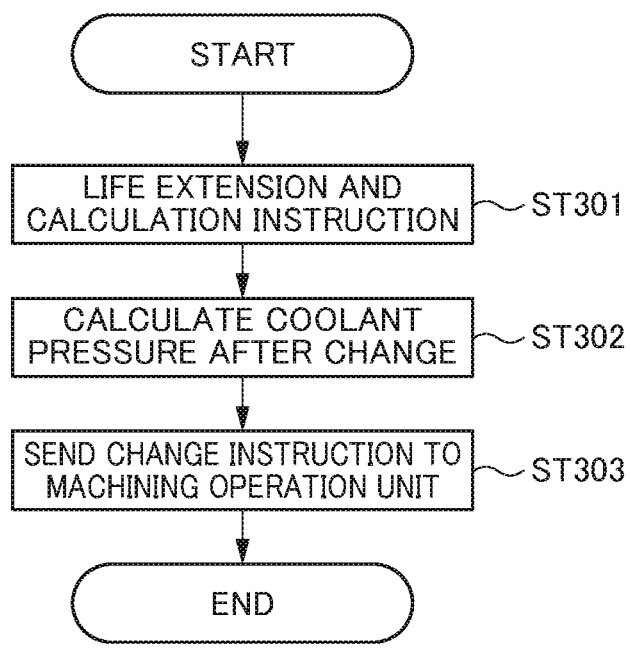
FIG. 8 is a flowchart illustrating an operation when a bearing life extension instruction of a bearing life prediction device according to an embodiment is received.

Next, by referring to FIGS. 6 to 8, the operation of the bearing life prediction device will be described. FIG. 6 is a flowchart illustrating a bearing life prediction operation of a bearing life prediction device according to an embodiment. FIG. 7 is a flowchart illustrating a bearing life prediction operation when a machining cycle operation of a bearing life prediction device according to an embodiment is changed. FIG. 8 is a flowchart illustrating an operation when a bearing life extension instruction of a bearing life prediction device according to an embodiment is received.

By referring to FIG. 6, a bearing life prediction operation of the bearing life prediction device according to the embodiment will be described. First, in step ST101, the motor model specifying unit 431 receives selection of information for specifying the motor model. The motor model specifying unit 431 outputs the received information for specifying the motor model to the bearing life prediction unit 350.

Subsequently, in step ST102, the machining cycle selecting unit 433 receives the selection of the first machining cycle operation. The machining cycle selecting unit 433 outputs information indicating that the first machining cycle operation is selected to the machining operation instruction unit 370.

Subsequently, in step ST103, the bearing life prediction instruction unit 435 receives a bearing life prediction instruction. The bearing life prediction instruction unit 435 outputs information indicating that the prediction instruction is issued to the machining operation instruction unit 370 and the bearing life prediction unit 350.

Subsequently, in step ST104, the machining operation instruction unit 370 receives an instruction from the bearing life prediction instruction unit 435 and instructs the machining operation unit 410 to execute the first machining cycle operation that does not involve an actual machining operation. The machining operation unit 410 causes the motor 10 and the coolant delivery unit 20 to execute the first machining cycle operation in a state in which an actual machining operation is not performed.

Subsequently, in step ST105, various pieces of information are acquired during the first machining cycle operation. Specifically, the pressure sensor 125 measures the pressure in the rotating shaft direction X applied to the front bearing 18. The temperature sensor 130 measures the temperature of the winding inserted into the slot and estimates the measured temperature as the temperature of the pair of bearings 18 and 19. The motor rotation number measuring unit 135 measures the rotation number of the motor 10 (the rotation number of the rotating shaft portion 16 and the bearings 18 and 19). The coolant pressure measuring unit 140 measures the pressure of the coolant liquid 5.

Subsequently, in step ST106, the bearing life prediction unit 350 predicts the bearing life on the basis of various pieces of information. The bearing life prediction unit 350 predicts the life of the pair of bearings 18 and 19 on the basis of the motor specification information including the specification information of the pair of bearings 18 and 19, the coolant pressure information, the pressure information in the rotating shaft direction X applied to the front bearing 18, the rotary joint information including at least the outer diameter information of the rotary joint 25 in the rotating member 27, the connecting portion information including at least the outer diameter information of the connecting portion 35, and the rotation number information of the motor 10, and the temperature information of the bearing, for example.

By referring to FIG. 7, a bearing life prediction operation when the machining cycle operation of the bearing life prediction device according to the embodiment is changed will be described. First, in step ST201, the machining cycle selecting unit 433 receives the selection of changing the machining cycle operation from a first machining cycle operation to a second machining cycle operation. The machining cycle selecting unit 433 outputs information indicating that the first machining cycle operation is changed to the second machining cycle operation to the machining operation instruction unit 370.

Subsequently, in step ST202, the bearing life prediction instruction unit 435 receives a bearing life prediction instruction. The bearing life prediction instruction unit 435 outputs information indicating that the prediction instruction is issued to the machining operation instruction unit 370 and the bearing life prediction unit 350.

Subsequently, in step ST203, the machining operation instruction unit 370 receives an instruction from the bearing life prediction instruction unit 435 and instructs the machining operation unit 410 to execute the second machining cycle operation that does not involve an actual machining operation. The machining operation unit 410 causes the motor 10 and the coolant delivery unit 20 to execute the second machining cycle operation in a state in which an actual machining operation is not performed.

Subsequently, in step ST204, various pieces of information are acquired during the second machining cycle operation. Specifically, the pressure sensor 125 measures the pressure in the rotating shaft direction X applied to the front bearing 18. The temperature sensor 130 estimates the temperature of a winding inserted into the slot as the temperature of the pair of bearings 18 and 19. The motor rotation number measuring unit 135 measures the rotation number of the motor 10 (the rotation number of the rotating shaft portion 16 and the bearings 18 and 19). The coolant pressure measuring unit 140 measures the pressure of the coolant liquid 5.

Subsequently, in step ST205, the bearing life prediction unit 350 predicts the bearing life on the basis of various pieces of information. The bearing life prediction unit 350 predicts the second bearing life of the pair of bearings 18 and 19 on the basis of the motor specification information including the specification information of the pair of bearings 18 and 19, the coolant pressure information, the pressure information in the rotating shaft direction X applied to the front bearing 18, the rotary joint information including at least the outer diameter information of the rotary joint 25 in the rotating member 27, the connecting portion information including at least the outer diameter information of the connecting portion 35, and the rotation number information of the motor 10, and the temperature information of the bearing, for example.

Subsequently, in step ST206, the bearing life prediction unit 350 predicts a remaining bearing life of the pair of bearings 18 and 19 on the basis of the predicted second bearing life, the first bearing life stored in the bearing life storage unit 290, and the (first) operating time stored in the operating time storage unit 280. The bearing life prediction unit 350 calculates the remaining bearing life by a formula: (second bearing life)÷(first bearing life)×((first bearing life)−((first) operating time)), for example.

By referring to FIG. 8, an operation when the bearing life of the bearing life prediction device according to the embodiment is received will be described. First, in step S301, the extension instruction unit 437 receives information on extension of the predicted life and an extension period. The extension instruction unit 437 instructs the bearing life prediction unit 350 to calculate and output a changed coolant pressure for extending the bearing life by a designated extension period.

Subsequently, in step ST302, the bearing life prediction unit 350 calculates (calculates back) the coolant pressure for changing the bearing life to a third bearing life which is the sum of the first bearing life and the extension period instructed by the extension instruction unit 437. The bearing life prediction unit 350 calculates the coolant pressure corresponding to an expected bearing life.

Subsequently, in step ST303, the bearing life prediction unit 350 instructs the machining operation instruction unit 370 to change the coolant pressure. In this way, the machining operation instruction unit 370 causes the machining operation unit 410 to operate according to a machining cycle operation in which the coolant pressure is changed.

According to the present embodiment, the following effects are obtained. According to the present embodiment, it is possible to provide a bearing life prediction device capable of predicting a life of a bearing 18,19 of a motor 10 by taking the load on a rotating shaft portion 16 by the pressure of a coolant liquid 5 into consideration.

According to the present embodiment, the bearing life prediction device 2 includes the pressure sensor 125 that measures the pressure in the rotating shaft direction X applied to the front bearing 18 disposed on the other end side (the X2 side, the front side) in the rotating shaft direction X of the pair of bearings 18 and 19. Therefore, it is possible to detect the magnitude of the pressure in the rotating shaft direction applied to the bearing easily. In this way, the bearing life prediction device can predict the life of the bearing easily.

According to the present embodiment, the bearing life prediction device 2 includes the temperature sensor 130 capable of measuring or predicting the temperature of the bearing 19, the motor rotation number measuring unit 135 capable of measuring the rotation number of the motor 10 (the rotating shaft portion 16), and the motor information storage unit 250 that stores the motor specification information including the bearing information. Therefore, it is possible to predict the life of the bearing accurately.

According to the present embodiment, the bearing life prediction device 2 includes the coolant pressure measuring unit 140 that measures the pressure of the coolant liquid 5, the rotary joint information storage unit 260 that stores the rotary joint information including the outer diameter information of the rotary joint 25 in the rotating member, and the connecting portion information storage unit 265 that stores the connecting portion information including the outer diameter information of the connecting portion 35. Therefore, it is possible to calculate a thrust load based on the coolant pressure applied to the rotating member (the bearing) accurately. In this way, the bearing life prediction device 2 can predict the life of the bearing accurately. According to the present embodiment, the bearing life prediction device 2 acquire the type information of the rotary joint 25 to predict the bearing life. Therefore, it is possible to predict the bearing life more accurately.

According to the present embodiment, the bearing life prediction device 2 causes the motor 10 and the coolant delivery unit 20 to execute the first machining cycle operation in a state in which an actual machining operation is not performed and predicts the first bearing life of the pair of bearings 18 and 19 on the basis of various pieces of information measured in the first machining cycle operation. In this way, the bearing life prediction device 2 can predict the life of the bearing easily without performing an actual machining operation.

According to the present embodiment, when the machining cycle is changed from the first machining cycle to the second machining cycle, the bearing life prediction device 2 causes the motor 10 and the coolant delivery unit 20 to execute the second machining cycle operation in a state in which an actual machining operation is not performed and predicts the second bearing life of the pair of bearings 18 and 19 on the basis of various pieces of information measured in the second machining cycle operation. The bearing life prediction device 2 predicts the remaining bearing life of the pair of bearings 18 and 19 on the basis of the predicted second bearing life, the first bearing life stored in the bearing life storage unit 290, and the (first) operating time stored in the operating time storage unit 280. In this way, the bearing life prediction device 2 can predict the remaining bearing life easily and accurately even when the machining cycle operation is changed.

According to the present embodiment, the bearing life prediction unit 350 calculates (calculates back) the coolant pressure for changing the bearing life to a third bearing life which is the sum of the first bearing life and an extension period instructed by the extension instruction unit 437. In this way, the bearing life prediction device 2 can predict the life of the bearing and output the information on the coolant pressure appropriate for extending the life of the bearing.

The present invention is not limited to the above-described embodiment, and modifications and improvements made within a range where the object of the present invention can be attained fall within the scope of the present invention. In the embodiment, the bearing life prediction unit 350 predicts the life of the pair of bearings 18 and 19 on the basis of the motor specification information, the coolant pressure information, the pressure information in the rotating shaft direction X applied to the front bearing 18, the rotary joint information including at least the outer diameter information of the rotary joint 25 in the rotating member 27, the connecting portion information including at least the outer diameter information of the connecting portion 35, the rotation number information of the motor 10, and the temperature information of the bearing. However, the present invention is not limited thereto. The bearing life prediction unit 350 may predict the life of the pair of bearings 18 and 19 without using the rotary joint information including at least the outer diameter information of the rotary joint 25 in the rotating member 27 and the connecting portion information including at least the outer diameter information of the connecting portion 35, for example.

EXPLANATION OF REFERENCE NUMERALS

2: Bearing life prediction device
5: Coolant liquid
10: Motor
12: Stator
16: Rotating shaft portion
25: Rotary joint
20: Coolant delivery unit
35: Connecting portion
30: Spindle
17: Rotating main body
18: Front bearing (Bearing)
19: Rear bearing (Bearing)
15: Rotor
101: Slot
125: Pressure sensor (Pressure measuring unit)
130: Temperature sensor (Motor state detecting unit)
135: Motor rotation number measuring unit (Motor state detecting unit)
140: Coolant pressure measuring unit
250: Motor information storage unit
280: Operating time storage unit
290: Bearing life storage unit
350: Bearing life prediction unit
380: Operating time measuring unit
410: Machining operation unit
431: Motor model specifying unit
437: Extension instruction unit
X: Rotating shaft direction

What is claimed is:

1. A bearing life prediction device that predicts a life of a pair of bearings that rotatably supports a rotating shaft portion of a motor used in a machine tool, through which a coolant liquid can be passed, the rotating shaft portion being connected to a coolant delivery unit via a rotary joint at one end in a rotating shaft direction and connected to a spindle capable of discharging the coolant liquid via a connecting portion at the other end, the bearing life prediction device comprising:

a pressure measuring unit that measures a pressure in the rotating shaft direction applied to a front bearing disposed on the other end side in the rotating shaft direction of the pair of bearings;

a coolant pressure measuring unit configured to measure a pressure of the coolant liquid as information of a change in a pre-load applied to the pair of bearings;

a motor state detecting unit that measures or predicts a rotation number of the motor and a temperature of the pair of bearings;

a motor information storage unit that stores model information for specifying respective motor models and motor specification information which is specification information of each motor model and includes at least specification information of the pair of bearings in correlation;

a motor model specifying unit that inputs or selects model information for specifying the motor model;

a bearing life prediction unit that predicts the life of the pair of bearings on the basis of the motor specification information including the specification information of the pair of bearings stored in the motor information storage unit in correlation with the model information input or selected by the motor model specifying unit, pressure information of the coolant liquid measured by the coolant pressure measuring unit, pressure information in the rotating shaft direction applied to the front bearing measured by the pressure measuring unit, rotation number information of the motor measured or predicted by the motor state detecting unit, and temperature information of the pair of bearings;

a machining operation unit that drives and moves the motor in a predetermined machining cycle and delivers the coolant liquid to the coolant delivery unit, the machining operation unit being configured to cause the motor and the coolant delivery unit to execute a first machining cycle operation in a state in which an actual machining operation is not performed, and the bearing life prediction unit being configured to predict a first bearing life of the pair of bearings on the basis of various pieces of information measured in the first machining cycle operation; and an extension instruction unit that outputs an instruction on extension of the predicted first bearing life of the bearing and an extension period, the bearing life prediction unit being configured to calculate a coolant pressure for changing the first bearing life to a third bearing life that is a sum of the first bearing life and the extension period instructed by the extension instruction unit.

2. The bearing life prediction device according to claim 1, further comprising:

an operating time measuring unit that measures an operating time in which the motor and the coolant delivery unit executed the first machining cycle operation;

an operating time storage unit that stores the operating time in which the first machining cycle operation was executed, measured by the operating time measuring unit; and a bearing life storage unit that stores the first bearing life predicted in the first machining cycle operation, wherein when a machining cycle is changed from the first machining cycle to a second machining cycle, the machining operation unit causes the motor and the coolant delivery unit to execute a second machining cycle operation in a state in which an actual machining operation is not performed, the bearing life prediction unit predicts a second bearing life of the pair of bearings on the basis of various pieces of information measured in the second machining cycle operation, and the bearing life prediction unit predicts a remaining life of the pair of bearings on the basis of the predicted second bearing life, the first bearing life stored in the bearing life storage unit, and the operating time stored in the operating time storage unit.

3. The bearing life prediction device according to claim 1, wherein the motor includes a rotor including the rotating shaft portion and a rotating main body and a stator including a plurality of slots that stores the rotating main body, faces an outer circumferential surface of the rotating main body, and has a winding, and the motor state detecting unit measures a temperature of the winding inserted into any one of the plurality of slots to estimate the temperature of the bearing.

* * * * *